(12) United States Patent
Tandon

(10) Patent No.: US 7,638,985 B2
(45) Date of Patent: Dec. 29, 2009

(54) SELF-EXCITATION OF SWITCHED RELUCTANCE GENERATORS DURING LOAD BUS FAULTS

(75) Inventor: Piyush Tandon, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 433 days.

(21) Appl. No.: 11/505,737

(22) Filed: Aug. 17, 2006

(65) Prior Publication Data

US 2008/0042611 A1   Feb. 21, 2008

(51) Int. Cl.
  *H02P 9/10*  (2006.01)
  *H02P 9/14*  (2006.01)
(52) U.S. Cl. .................. 322/60; 318/254.1; 318/701; 322/63; 320/166
(58) Field of Classification Search ............ 322/59, 322/60, 63; 320/166, 167; 318/254.1, 701
  See application file for complete search history.

(56) References Cited

U.S. PATENT DOCUMENTS

| | | | |
|---|---|---|---|
| 4,896,088 A | 1/1990 | Jahns | |
| 5,289,107 A | 2/1994 | Radun | |
| 5,404,091 A | 4/1995 | Radun | |
| 5,850,133 A | 12/1998 | Heglund | |
| 5,864,477 A | 1/1999 | Webster | |
| 6,137,256 A * | 10/2000 | Morris | 318/701 |

\* cited by examiner

*Primary Examiner*—Patrick J Assouad
*Assistant Examiner*—Ramy Ramadan
(74) *Attorney, Agent, or Firm*—Carlson, Gaskey & Olds

(57) ABSTRACT

A self-excited, switched reluctance generator obtains excitation energy from a capacitor bank via an excitation bus during normal operation. During a short-circuit or load fault, one or more phases of the generator provide power to the excitation bus while the remaining phases send current to a faulted positive bus. The system does not require an external battery or power source for excitation energy. The system is capable of resuming normal operation after the load bus fault.

18 Claims, 2 Drawing Sheets

SELF-EXCITATION OF SWITCHED RELUCTANCE GENERATORS DURING LOAD BUS FAULTS

BACKGROUND OF THE INVENTION

This invention generally relates to self-excitation of a switched reluctance generator during a short-circuit or load bus fault without the need for a battery or auxiliary DC power source.

Switched reluctance electric generators are often used in aerospace applications, where they typically provide electrical power for the vehicle in which they reside. In such aerospace applications, a generator must be able to provide current during short-circuit and fault conditions on a positive load bus.

A load fault can occur when the maximum load current for a particular generator system is exceeded. A common type of load fault is a short circuit, which is an accidental low-resistance connection between two nodes of a circuit that are meant to be at different voltages. A load fault would typically happen not in the generator itself but somewhere in the load that it is powering. If a fault occurs, the output voltage of the generator drops to zero. During such a load fault, current from the generator is still needed to operate protective devices such as circuit-breakers and fuses.

Switched reluctance electric generators also require excitation energy to operate. This excitation energy must come from a DC power source. Since a switched reluctance generator itself is a source of DC power, the generator typically relies on its own DC output as a source of excitation energy. This is known as self-excitation, because the device is producing its own excitation energy.

In the event of a short-circuit or load fault, the generator still requires excitation energy to provide current for protective devices, however because of the short-circuit or fault condition, the generator can no longer use its DC output as a source of this energy. In such situations, a switched reluctance generator needs an alternate source of excitation energy to keep operating. Without the necessary excitation energy to sustain the generator in the event of a fault, the entire system would simply discharge and stop producing power. However, if a source of excitation energy is present during a fault, the generator can continue producing current and can return to its normal voltage and resume normal operation.

A conventional solution to this need for excitation energy involves a capacitor bank connected to a positive and negative bus of the generator. In this setup, the generator takes a small amount of energy from the capacitor bank for excitation during each electrical cycle. In the event of a fault on a load bus, this capacitor bank will completely discharge. A drawback of this conventional setup is that once the capacitor bank discharges, it can no longer excite the switched reluctance generator to operate, because the capacitor bank has been discharged to zero volts.

Another solution to this problem involves maintaining a separate excitation bus connected to an external power source, such as a battery or other auxiliary generator in the electrical system. Although this overcomes the earlier problem, it introduces additional problems. One drawback to this solution is overall diminished reliability due to the increased complexity and the need for additional hardware. Another drawback is an increase in the overall weight of the generator, which is undesirable in aerospace applications, due to the additional power source.

It is therefore the objective of this invention to provide a novel scheme for self-excitation of a switched reluctance generator in the event of a load bus fault, which does not require a battery or auxiliary generator in the electrical system.

SUMMARY OF THE INVENTION

A typical switched reluctance generator has three or more phases. Each phase comprises at least one diode, at least one switch, and an inductive winding. Each inductive winding corresponds to a diametrically opposite pair of stator poles of the generator. The power transfer of the generator is controlled by timing the current pulses in each phase with respect to a corresponding rotor position.

Excitation energy is necessary to start the generator and to get the generator to begin producing electricity. Once the generator is running and is producing electricity, additional excitation energy is necessary to sustain the generator. A switched reluctance generator typically has three or more phases. Each phase of the generator takes turns requiring excitation energy as the rotor rotates. All of the phases do not require excitation energy simultaneously. Each phase in the generator contains its own inductive winding. Excitation energy is stored in the magnetic field created by this winding. Typically a shaft position sensor is used to determine which phase requires excitation energy at any given time.

In the event of a load bus fault, the present invention provides a method of utilizing a portion of the current from one phase of the switched reluctance generator to provide the requisite excitation energy while the remaining phases deliver energy to the faulted positive bus as required. This eliminates the need for a battery or other auxiliary generator. This invention thus provides both weight reduction and reliability improvement. In addition, even though this generator relies on a capacitor bank for excitation energy under normal operating conditions as in the prior art, the problem of the prior art where once the capacitor bank is discharged the generator can no longer operate, is avoided. Unlike the prior art the capacitor bank is never fully discharged. In addition, this generator may also be used a motor. Due to this dual functionality as either a generator or a motor, it is common to refer to a switched reluctance generator as a switched reluctance machine.

The present invention can be expanded to a wide variety of switched reluctance generator designs that have a plurality of phase windings or coils. This includes, but is not limited to, designs with varying numbers of phases (e.g. 3, 4, 5, or 6) and varying stator and rotor pole combinations (e.g. 6-4, 12-8, 8-6, etc.). In addition, this invention is not limited to aerospace systems, but could be employed in any application that requires a fault tolerant electric generator.

These and other features of the present invention can be best understood from the following specification and drawings, the following of which is a brief description.

DESCRIPTION OF THE PREFERRED EMBODIMENT

Figure 1:
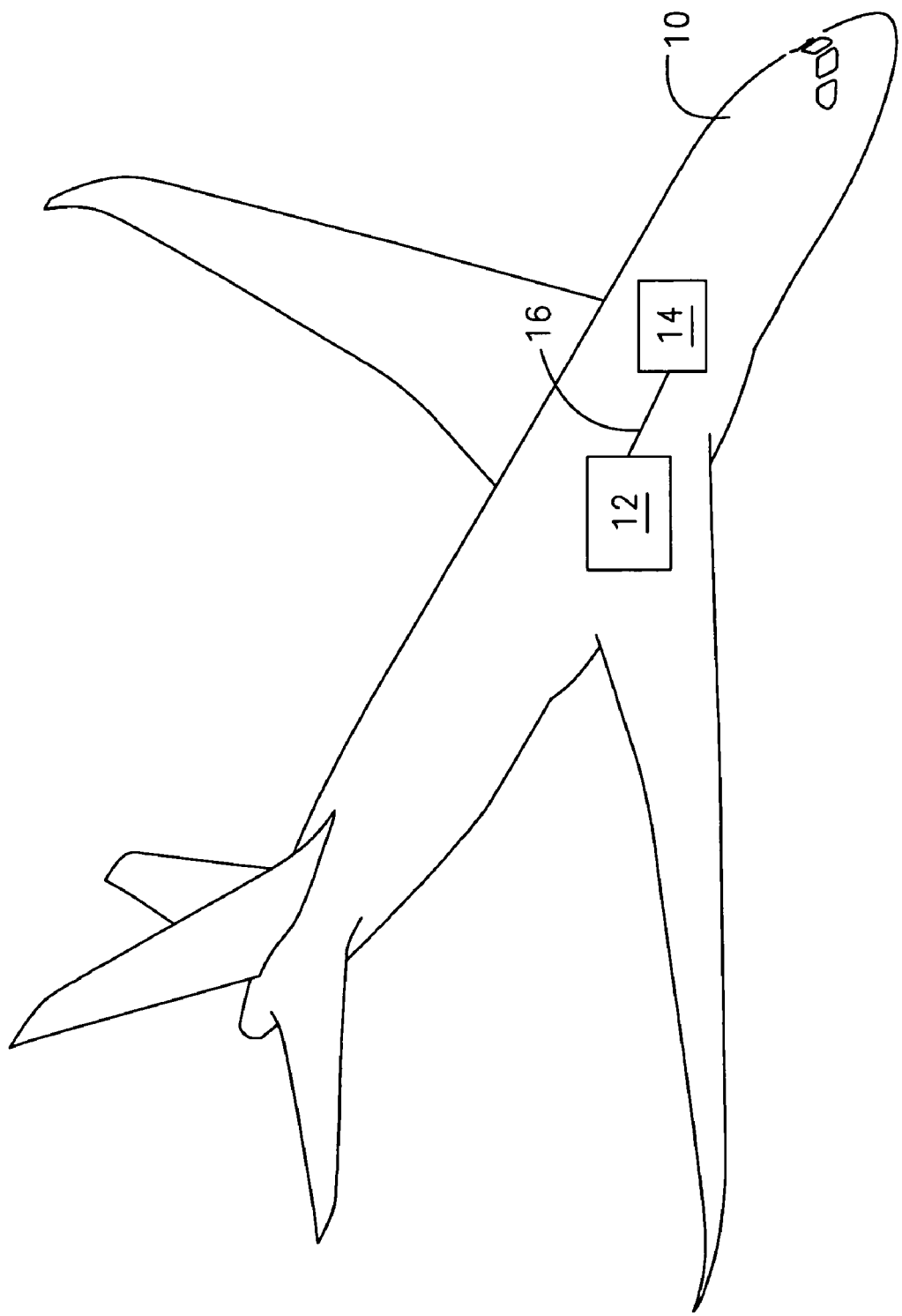
FIG. 1 schematically shows the present invention in an example environment of an aircraft.

FIG. 1 schematically shows the present invention in an example environment of an aircraft 10. The aircraft 10 comprises a switched reluctance generator 12, a load 14, and a connection 16. Depending on the size and type of the aircraft, numeral 12 might represent a plurality of switched reluctance generators. Load 14 represents any device in the aircraft that requires electricity. The generator 12 is connected to the load 14 by the connection 16. The connection 16 represents both a positive and a negative bus of the generator 12. Although FIG. 1 shows an aircraft, this invention is not limited to use in an aircraft. FIG. 1 is merely presented to show one use of the present invention.

Figure 2:
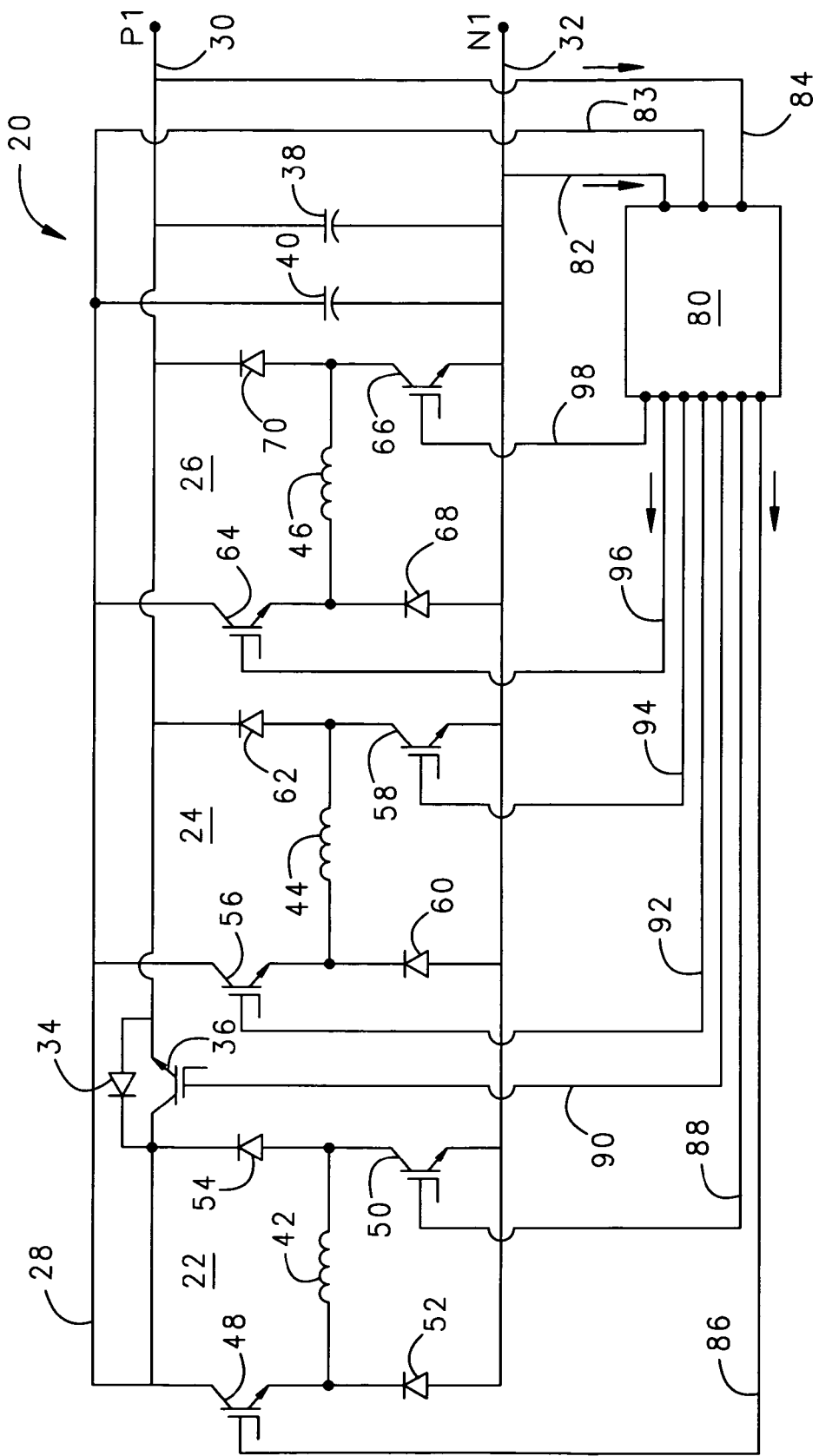
FIG. 2 is a schematic representation of a switched reluctance generator employing the present invention.

FIG. 2 shows circuit 20 for a switched reluctance generator, comprising three phases 22, 24, and 26. An alternative embodiment could include additional phases. Each phase includes an inductive winding, two switches, and two diodes. While it is possible that each phase might comprise just one switch and just one diode, there will typically be two of each. Phase 22 comprises switches 48 and 50, diodes 52 and 54, and winding 42. Phase 24 comprises switches 56 and 58, diodes 60 and 62, and winding 44. Phase 26 comprises switches 64 and 66, diodes 68 and 70, and winding 46. Diode 34 and switch 36 are placed in parallel on the positive bus 30 between phases 22 and 24. Depending on the voltage and current ratings required, the switches may be semiconductor devices such as MOSFETs or IGBTs. Capacitor bank 38 acts as a filter for the generator system.

Capacitor bank 40 provides excitation energy for the system under normal load conditions. Excitation energy is sent from capacitor bank 40 into excitation bus 28, and then through either switch 48, switch 56, or switch 64. The generator circuit provides power to a load (not shown). The load would be located between points P1 and N1. A load fault or short circuit would typically occur between points P1 and N1 and not in one of the three phases 22, 24, or 26.

This circuit topology allows independent control of current in each phase 22, 24, and 26 of the generator. In addition, this circuit permits the system to operate as either an electric generator or as a motor. Each inductive winding 42, 44, and 46 corresponds to a pair of diametrically opposite stator poles (not shown) in the generator. The power transfer is controlled by timing the current pulses in each phase with respect to the corresponding position of a rotor in the generator, so that when the rotor poles are moving into alignment with the excited stator poles, current flows into the winding.

Under normal load conditions, when the switched reluctance generator 12 is operating as a self-excited generator, switch 36 is closed or 'ON.' The controller 80 acts as a sensor by monitoring the voltage across the positive bus 30 and negative bus 32, and by monitoring the voltage across the excitation bus 28 and negative bus 32 to detect when a fault occurs.

A switching operation in the circuit is performed by the controller 80. The controller may consist of analog and digital circuits. If the control circuit is digital, then the controller 80 can perform the switching electronically with a microprocessor. The semiconductor devices 34 and 36 may be replaced by a suitable mechanical switch, such as a relay or contactor. A worker skilled in this art would recognize how to provide an appropriate method to switch. The three inputs of the controller 80 are the input 82 from the negative bus 32, the input 83 from the excitation bus 28, and the input 84 from the positive bus 30. The controller is connected to each switch in the generator via output connections 86, 88, 90, 92, 94, 96, and 98.

Capacitor bank 40 provides excitation energy for the system under normal load conditions, with each phase taking turns drawing current from the capacitor bank 40. However the capacitor bank 40 never fully discharges under normal load conditions. When a fault is detected on the positive bus 30, switch 36 must be opened or forced 'OFF.'

When the controller 80 detects a fault, the controller forces switch 36 open into an 'OFF' position. Diode 34 prevents the excitation bus 28 from discharging into the faulted positive bus 30. At this point current from phase 22 would flow into the excitation bus 28. Excitation bus 28 would then deliver the requisite excitation energy current to the phases 24 and 26 to sustain the generator. Phases 24 and 26 would not simultaneously require excitation energy. The excitation energy would first be provided to one of the phases, and then to the next phase. Meanwhile, phases 24 and 26 would provide current to the faulted positive bus 30 until the fault is cleared. The need for an external power source is eliminated because phase 22 provides the requisite excitation energy and capacitor bank 40 does not fully discharge. When the main bus voltage P1-N1 rises back to its normal value, the switch 36 can be re-closed and the generator system can resume normal operation.

FIG. 2 shows a particular embodiment of the invention where diode 34 and switch 36 are connected to the output of phase 22. In this embodiment, phase 22 is able to be the phase that supplies excitation energy in the event of a fault, with phases 24 and 26 providing current to the faulted positive bus 30. Depending on the placement of diode 34 and switch 36, any of the phases can provide excitation energy to the other phases. FIG. 1 is not intended to limit phase 22 as being the only phase that can excite the other phases in the event of a fault.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A switched reluctance machine comprising:
a power supply with a plurality of phases;
an excitation bus operable to deliver excitation current to said plurality of phases; and
at least one capacitor bank in parallel with said plurality of phases, wherein the excitation bus draws the excitation current from the capacitor bank but not from the plurality of phases of the machine in a first condition, and draws the excitation current from one of the plurality of phases of the machine but not from the capacitor bank in a second condition.

2. The machine of claim 1, wherein each phase contains a winding, and at least one of a switch and a diode.

3. The machine of claim 2, wherein said switches are electronically operated by a controller.

4. The machine of claim 1, wherein a switch and diode are placed in parallel on a positive bus and are operable to prevent said excitation bus from discharging into said positive bus in said second condition.

5. The machine of claim 4, wherein in the first condition said switch on the positive bus is closed.

6. The machine of claim 5, wherein the first condition corresponds to a normal load condition.

7. The machine of claim 4, wherein in the second condition said switch on the positive bus is open.

8. The machine of claim 7, wherein the second condition corresponds to a load fault condition.

9. A method of providing excitation energy to a switched reluctance machine comprising:
obtaining excitation energy for a phase of a switched reluctance machine from a capacitor bank but not from one of a plurality of phases of the switched reluctance machine in response to a first condition; and obtaining excitation energy for the phase of the switched reluctance machine from another of the plurality of phases of the switched reluctance machine but not from the capacitor bank in response to a second condition.

10. The method of claim 9, wherein the first condition corresponds to a normal load condition, and the second condition corresponds to a load fault condition.

11. The method of claim 10, wherein said obtaining excitation energy for the phase of the switched reluctance machine from another of the plurality of phases the switched reluctance machine but not from the capacitor bank in response to a second condition includes:

drawing an excitation current from a first of the plurality of phases; and drawing a current from at least a second of the plurality of phases to a positive bus until a load fault condition on the positive bus clears.

12. The method of claim 11, wherein said obtaining excitation energy for the phase of the switched reluctance machine from another of the plurality of phases the switched reluctance machine but not from the capacitor bank in response to a second condition includes:

disconnecting a portion of the positive bus between said first of the plurality of phases and said at least a second of the plurality of phases.

13. The machine of claim 1, wherein the power supply provides power to an aircraft.

14. A switched reluctance machine comprising:

a power supply with a plurality of phases;

an excitation bus operable to deliver excitation current to the plurality of phases; and at least one capacitor bank in parallel with the plurality of phases; and a switch on a positive bus operable to control a discharge of at least one of the phases, wherein in a first condition the switch is ON and the excitation bus draws excitation current from the capacitor bank but not from the plurality of phases, and in a second condition the switch is OFF and the excitation bus draws excitation current from at least one of the plurality of phases but not from the capacitor bank.

15. The machine of claim 14, wherein the switch being in the OFF state prevents the capacitor bank from fully discharging into the excitation bus.

16. The machine of claim 14, wherein the switch being in the OFF state prevents the at least one of the phases from discharging along a positive bus to a load.

17. The machine of claim 14, wherein the switch is connected in parallel to a diode on the positive bus, the diode being oriented to prevent the at least one of the phases from discharging into said positive bus in said second condition.

18. The machine of claim 14, wherein the switch is connected in parallel to a diode on the positive bus, the diode being oriented to prevent the capacitor bank from fully discharging in said second condition.

* * * * *

UNITED STATES PATENT AND TRADEMARK OFFICE
CERTIFICATE OF CORRECTION

| | | |
|---|---|---|
| PATENT NO. | : 7,638,985 B2 | Page 1 of 1 |
| APPLICATION NO. | : 11/505737 | |
| DATED | : December 29, 2009 | |
| INVENTOR(S) | : Piyush Tandon | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 484 days.

Signed and Sealed this

Twenty-first Day of December, 2010

David J. Kappos
*Director of the United States Patent and Trademark Office*